(12) United States Patent
Lin et al.

(10) Patent No.: US 9,363,750 B2
(45) Date of Patent: Jun. 7, 2016

(54) DEVICES AND METHODS FOR CONTROL CHANNEL DECODING WITH PREAMBLE SKIP TO REDUCE DECODING TIME

(71) Applicant: QUALCOMM Incorporated, San Diego, CA (US)

(72) Inventors: Lijun Lin, Chula Vista, CA (US); Kamalakar Ganti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 14/099,580

(22) Filed: Dec. 6, 2013

(65) Prior Publication Data

US 2015/0163738 A1    Jun. 11, 2015

(51) Int. Cl.
| | | |
|---|---|---|
| H04L 12/43 | (2006.01) | |
| H04W 52/02 | (2009.01) | |
| H04L 1/00 | (2006.01) | |
| H04W 72/04 | (2009.01) | |

(52) U.S. Cl.
CPC ......... *H04W 52/0216* (2013.01); *H04L 1/0002* (2013.01); *H04W 52/0229* (2013.01); *H04W 52/0245* (2013.01); *H04W 72/0446* (2013.01)

(58) Field of Classification Search
CPC ..................... H04W 52/0216; H04W 52/0245; H04W 72/0446; H04L 1/0002
USPC ................................. 370/310–443, 458–461
See application file for complete search history.

(56) References Cited

U.S. PATENT DOCUMENTS

| | | | |
|---|---|---|---|
| 5,710,784 A | 1/1998 | Kindred et al. | |
| 7,627,298 B2 | 12/2009 | Taira et al. | |
| 8,462,740 B2 | 6/2013 | Kwak et al. | |
| 2003/0188252 A1* | 10/2003 | Kim | H04L 1/0046 714/779 |
| 2005/0226173 A1* | 10/2005 | Strawczynski | H04B 1/7075 370/278 |
| 2005/0266895 A1 | 12/2005 | Okamoto et al. | |
| 2010/0165903 A1 | 7/2010 | Inohiza | |
| 2012/0171954 A1* | 7/2012 | Rudland | H04W 52/0225 455/41.1 |
| 2012/0188989 A1 | 7/2012 | Yokota et al. | |

FOREIGN PATENT DOCUMENTS

WO    WO-2004/049652 A1 *    6/2004

OTHER PUBLICATIONS

International Search Report and Written Opinion—PCT/US2014/068928—ISA/EPO—Feb. 23, 2015.

* cited by examiner

*Primary Examiner* — Ricky Ngo
*Assistant Examiner* — Wei-Po Kao
(74) *Attorney, Agent, or Firm* — Loza & Loza LLP (57) ABSTRACT

Access terminals are configured to decrease awake state durations (and conversely increase standby state durations) utilizing a preamble skip operation. According to one example, an access terminal may assign a finger of a receiver to receive a control channel transmission at a time after a beginning of a preamble of the control channel transmission, and before an initial boundary of a slot after a first slot of the control channel transmission, the preamble of the control channel transmission including information corresponding to a data rate of the control channel transmission. The access terminal may further be configured to decode the control channel transmission in accordance with a predicted data rate. Other aspects, embodiments, and features are also included.

26 Claims, 11 Drawing Sheets

DEVICES AND METHODS FOR CONTROL CHANNEL DECODING WITH PREAMBLE SKIP TO REDUCE DECODING TIME

TECHNICAL FIELD

The technology discussed below relates generally to wireless communications, and more specifically to methods and devices for receiver finger assignments for receiving wireless transmissions. Implementation of aspects and features of the present disclosure can lead to power savings.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. These devices may be generally referred to as access terminals. Access terminals are becoming increasingly popular, with consumers often using power-hungry applications that run on such access terminals. Access terminals are typically battery-powered and the amount of power a battery can provide between charges is generally limited. In order to conserve power, access terminals enter an idle state. The access terminal returns to an active or wake up state to decode incoming communications. Thus, the power consumption relates to the time that the access terminal is in the awake state.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate power conservation by delaying the decoding of a control channel packet to reduce the duration of an awake state (and increasing standby state duration) and by reducing decoding time.

According to at least one aspect of the disclosure, methods operational on an access terminal include assigning a finger of a receiver to receive a control channel transmission at a time after a beginning of a preamble of the control channel transmission, and before an initial boundary of a slot after a first slot of the control channel transmission, the preamble of the control channel transmission includes information corresponding to a data rate of the control channel transmission. The methods operational on access wireless communication further include decoding the control channel transmission in accordance with a predicted data rate.

Further aspects provide an apparatus for wireless communication including means for assigning a finger of a receiver to receive a control channel transmission at a time after a beginning of a preamble of the control channel transmission, and before an initial boundary of a slot after a first slot of the control channel transmission, the preamble of the control channel transmission comprising information corresponding to a data rate of the control channel transmission. The apparatus for wireless communication further includes means for decoding the control channel transmission in accordance with a predicted data rate.

Still further aspects include wireless communication devices that include a communication interface including a receiver circuit, a storage medium and a processing circuit coupled to the communication interface and the storage medium. The processing circuit is configured to assign a finger of a receiver to receive a control channel transmission at a time after a beginning of a preamble of the control channel transmission, and before an initial boundary of a slot after a first slot of the control channel transmission, the preamble of the control channel transmission comprising information corresponding to a data rate of the control channel transmission. The processing circuit is further configured to decode the control channel transmission in accordance with a predicted data rate.

Further aspects include a non-transitory processor-readable storage medium that includes programming. The programming causes a processing circuit to assign a finger of a receiver to receive a control channel transmission at a time after a beginning of a preamble of the control channel transmission, and before an initial boundary of a slot after a first slot of the control channel transmission, the preamble of the control channel transmission comprising information corresponding to a data rate of the control channel transmission. Also, the programming causes a processing circuit to decode the control channel transmission in accordance with a predicted data rate.

These and other aspects of the invention will become more fully understood upon a review of the detailed description, which follows. Other aspects, features, and embodiments associated with the present disclosure will become apparent to those of ordinary skill in the art upon reviewing the following description in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for and 3rd Generation Partnership Project 2 (3GPP2) protocols and systems (e.g., 1× EV-DO), and related terminology may be found in much of the following description. However, those of ordinary skill in the art will recognize that one or more aspects of the present disclosure may be employed and included in one or more other wireless communication protocols and systems.

Figure 1:
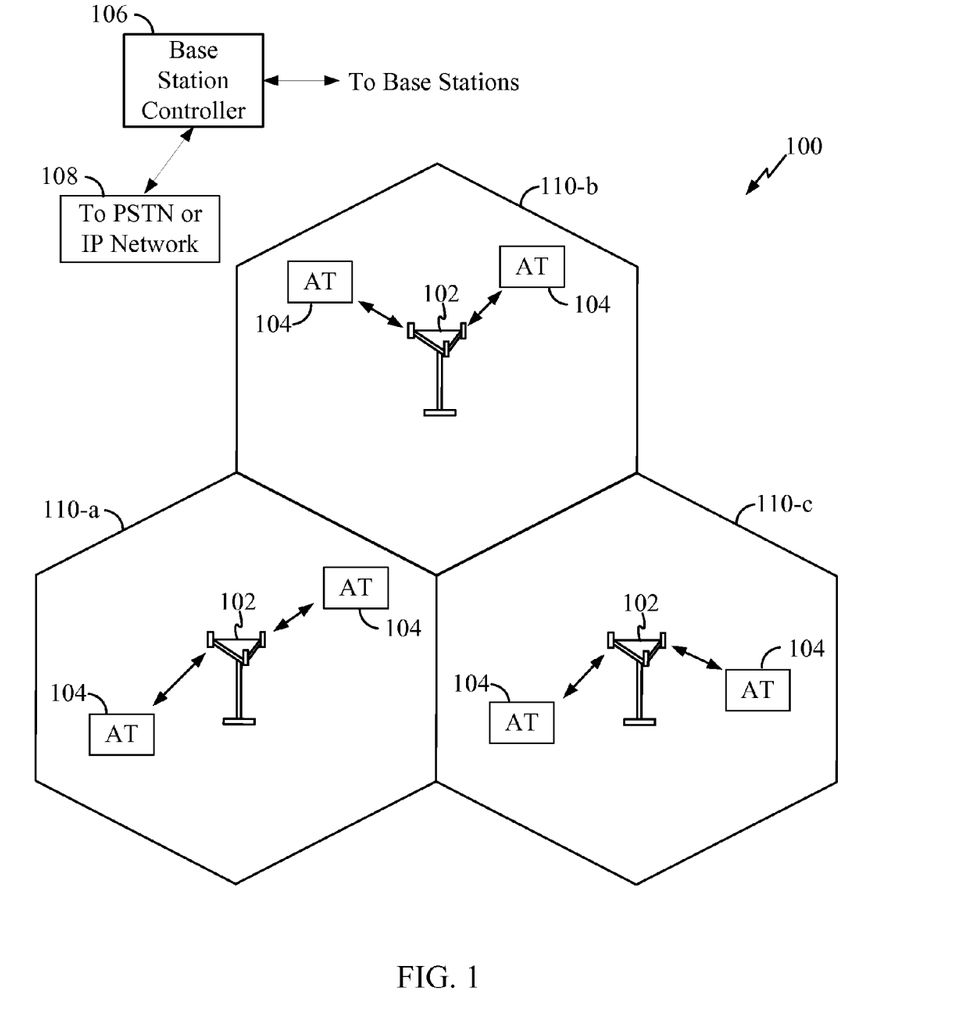
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

An access terminal 104 operating within the wireless communications system 100 may employ various operating modes, including a connected (or traffic) mode and an idle (or standby) mode. In connected mode, the access terminal 104 may actively exchange data (e.g., voice or data calls or sessions) with one or more base stations 102. In idle mode, the access terminal 104 is generally not actively exchanging data, but may monitor control channels to facilitate updates, enable mobility (e.g., handing over to the best proximate base station 102), and to enable paging and incoming calls, among other functions.

When operating in the idle mode, the access terminal can conserve power by periodically monitoring the control channels of a control channel transmission in a slotted idle mode, instead of monitoring the control channels continuously. The slotted idle mode may also be referred to by those of skill in the art as discontinuous reception mode or DRX mode. In the slotted idle mode, the access terminal 104 periodically wakes up from a "standby" state and enters an "awake" state by powering on its receiver circuitry at known time intervals and processes a control channel for messages scheduled to be transmitted from the base station(s) 102. If additional communication is not required, the access terminal 104 can revert back to the standby state until the next designated time.

Figure 2:
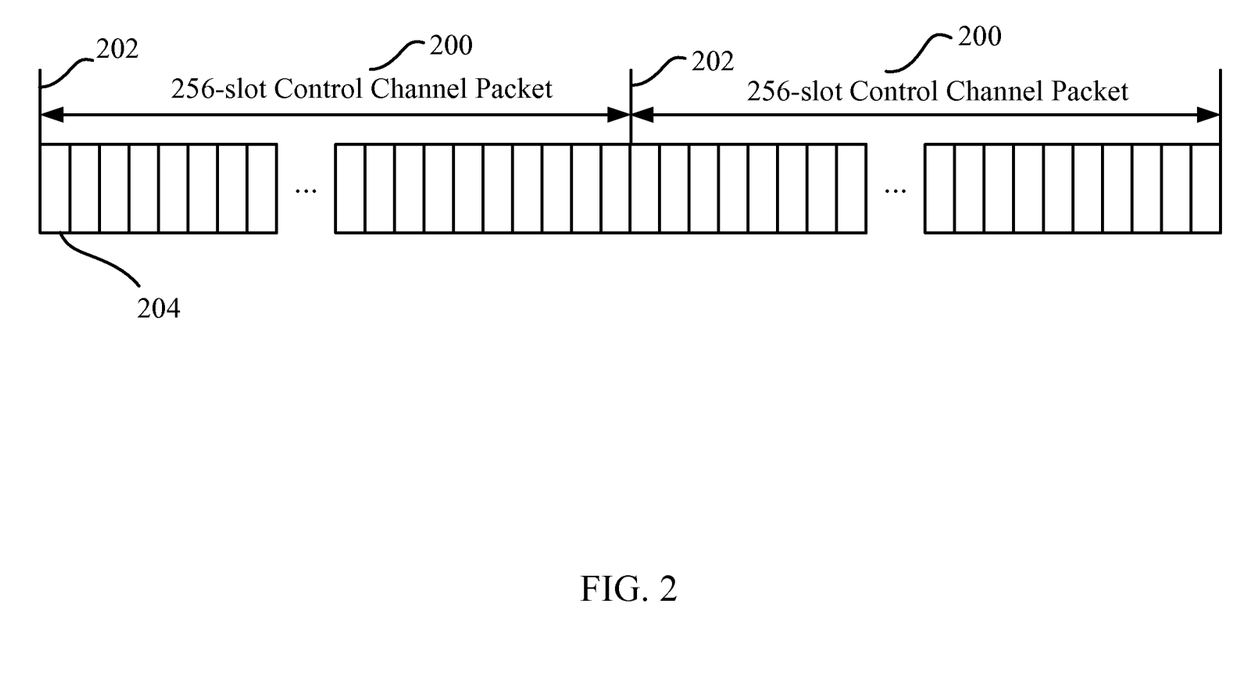
FIG. 2 is a timing diagram illustrating portions of two 256-slot synchronous control channel (SCC) cycles according to at least one example of a slotted idle mode.

FIG. 2 is a timing diagram illustrating portions of two 256-slot synchronous control channel (SCC) cycles corresponding to packets carried on a control channel packet 200 according to at least one example of a slotted idle mode. The illustrated 256-slot control channel transmission is provided merely to illustrate one example of a structure of a forward link control channel transmission, and any other suitable structure may be utilized within the scope of the present disclosure. As utilized herein, the term "slot" may be interpreted to be any suitable division or organization of data into discrete or separate time units, and slots may have any suitable duration (including but not limited to 1.66 ms) within the scope of the disclosure. In a slotted idle mode, the access terminal 104 will typically wake up at a predetermined time before a control channel packet is to be received by powering on one or more components, such as its receiver circuitry. In general, the wake up time occurs 2 or 3 ms prior to an initial boundary 202 of a packet corresponding to the control channel packet 200 in an effort to receive the first control channel packet transmitted by the base station 102. The control channel transmission typically includes preamble data in the first half slot of the first slot 204. The preamble data includes an SCC rate, which provides the access terminal 104 with the forward link data rate of the data packets on the control channel, and enables the receiving device to suitably decode the packets based on that rate.

Figure 3:
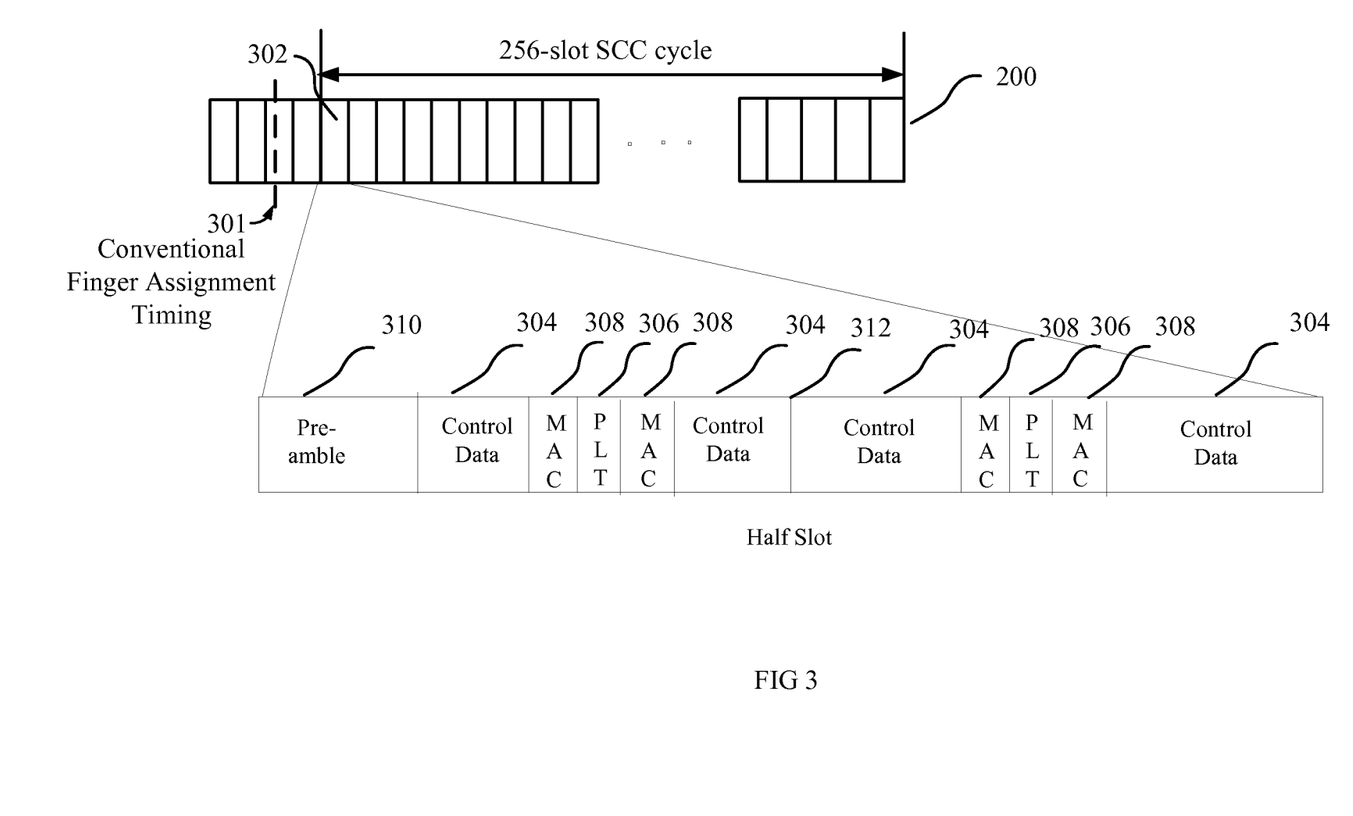
FIG. 3 is a timing diagram depicting a time slot structure for transmission of data and for implementing various aspects of the present disclosure.

FIG. 3 is a timing diagram depicting one example of a forward link time slot structure of an SCC cycle corresponding to the control channel packet 200 according to various aspects of the present disclosure. The illustrated structure may be used for communications on the forward link to the access terminal 104 in the communication system 100. Of course, aspects of the present disclosure are not limited to the specific illustrated structure, and the details described herein may be modified within the scope of the present disclosure. In this example, a first slot 302 of the control channel packet 200 is broken out and magnified to illustrate elements of the first slot 302 of the control channel packet 200. Each time slot may have 2048 chips. One half of a slot time 312 may have 1024 chips. Each half slot 312 has two control channel data fields 304. Each control channel data field 304 may have 400 chips. Each half slot 312 also has a pilot data field 306. The pilot data field 306 may have 96 chips. Each half slot also has two MAC control data fields 308. During idle time, the control data fields 304 may carry no data. The pilot data field 306 and control channel data field 304 carry respectively pilot data and control data. The first half slot 312 of the first slot 302 also contains the preamble 310. In this example, the first time slot 302 used to transmit the packet of data carries the preamble data. The number of chips in the preamble 310 depends on the transmission data rate. The preamble 310 may further include information corresponding to the SCC rate of data on the control channel packet 200, which is typically utilized to decode the data on the control channel transmission. After transmitting the preamble 310, the control data follows. The transmission of the control channel data and other traffic data may continue for the remaining time slots.

As described above, in a conventional access terminal, finger assignment 301 typically occurs in the range of 2 to 3 ms before the beginning of the first slot 302 of the control channel packet 200. In this way, a conventional access terminal may receive the preamble 310 and determine the SCC rate for decoding the information carried on the control channel transmission. However, this finger assignment timing 301 results in increased power consumption, by virtue of the need to power up the access terminal and utilize the receiver for up to 2 or 3 ms prior to the initial boundary of the control channel packet, as well as to receive and decode the SCC rate carried on the preamble 310. Therefore, according to one or more aspects of the present disclosure, finger assignment timing may be delayed relative to the convention finger assignment timing 301, resulting in longer standby times and shorter wake times, and accordingly, reduced power consumption at the access terminal 104.

Figure 4:
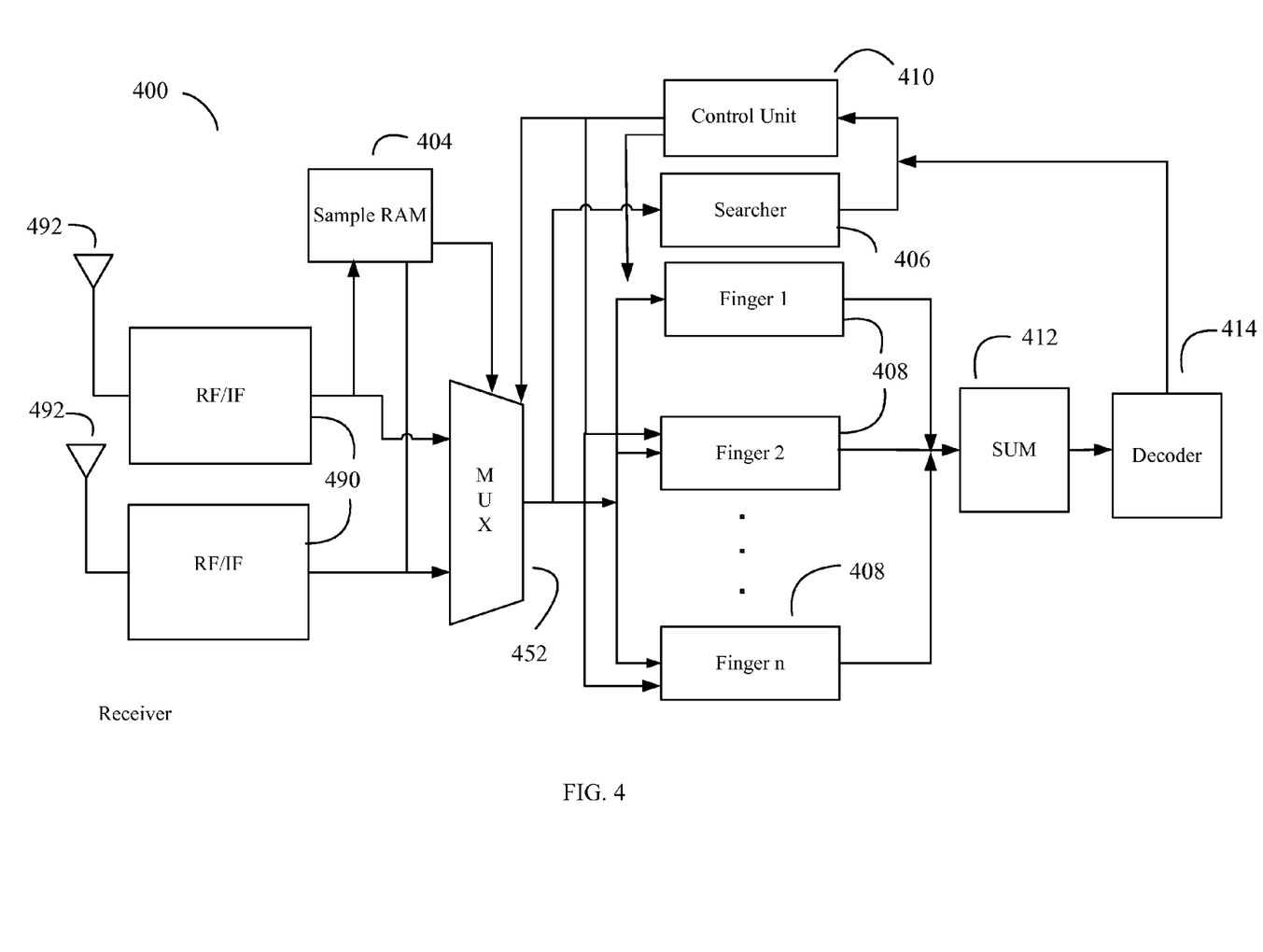
FIG. 4 is a block diagram of a receiver circuit for operation according with various aspects of the present disclosure.

FIG. 4 illustrates a block diagram of a receiver circuit 400 for operation according to various aspects of the present disclosure. In one aspect of the present disclosure, the receiver circuit 400 is a rake receiver. Receiver circuit 400 may be used for decoding the information on the forward link signals, including but not limited to control channel packet 200. Receiver circuit 400 in an access terminal 104 may be used for detection of preamble 310, decoding pilot data 306 and the control data 304 transmitted from a base station. Receive samples may be stored in RAM 404. Receive samples are generated by a radio frequency/intermediate frequency (RF/IF) system 490 and an antenna system 492. The RF/IF system 490 and antenna system 492 may include, for example, one or more components for receiving multiple signals and RF/IF processing of the received signals for taking advantage of receive diversity gain. Of course, receive diversity is merely one example, and in other aspects, the RF/IF system 490 and antenna system 492 may include only one antenna 492 and one component for RF/IF processing of received signals. Antenna system 492 receives the RF signals, and passes the RF signals to RF/IF system 490. RF/IF system 490 may be any conventional RF/IF receiver. The received RF signals are demodulated. A demodulator in the RF/IF system filters, down-converts and digitizes the received RF signals to form Rx samples at base band frequencies. The samples are supplied to a multiplexer (mux) 452. The output of mux 452 is supplied to a searcher unit 406 and finger elements 408. A control unit 410 is coupled thereto. A combiner 412 couples a decoder 414 to finger elements 408. Control unit 410 may be a microprocessor controlled by software, and may be located on the same integrated circuit or on a separate integrated circuit. Control unit 410 may also be included in processing circuit 502 (see FIG. 5) or may be in communication with processing circuit 502. Software controlling control unit 410 may, for example, be located on storage medium 506, described below. Receiver circuit 400 may implement the processes illustrated and described in FIGS. 7-10.

As noted, conventional access terminals are typically configured to wake up and assign a receiver finger 408 prior to the initial boundary 202 of a packet transmitted on the control channel. That is, upon waking up, the receiver circuit 400 in a conventional access terminal assigns a finger (one of a number of correlation receivers within a standard rake receiver) 408 to be used to receive the control channel packet 200. The finger assignment is conventionally performed 2 to 3 ms before the boundary of the first slot of the control channel packet received on the control channel packet 200.

Figure 5:
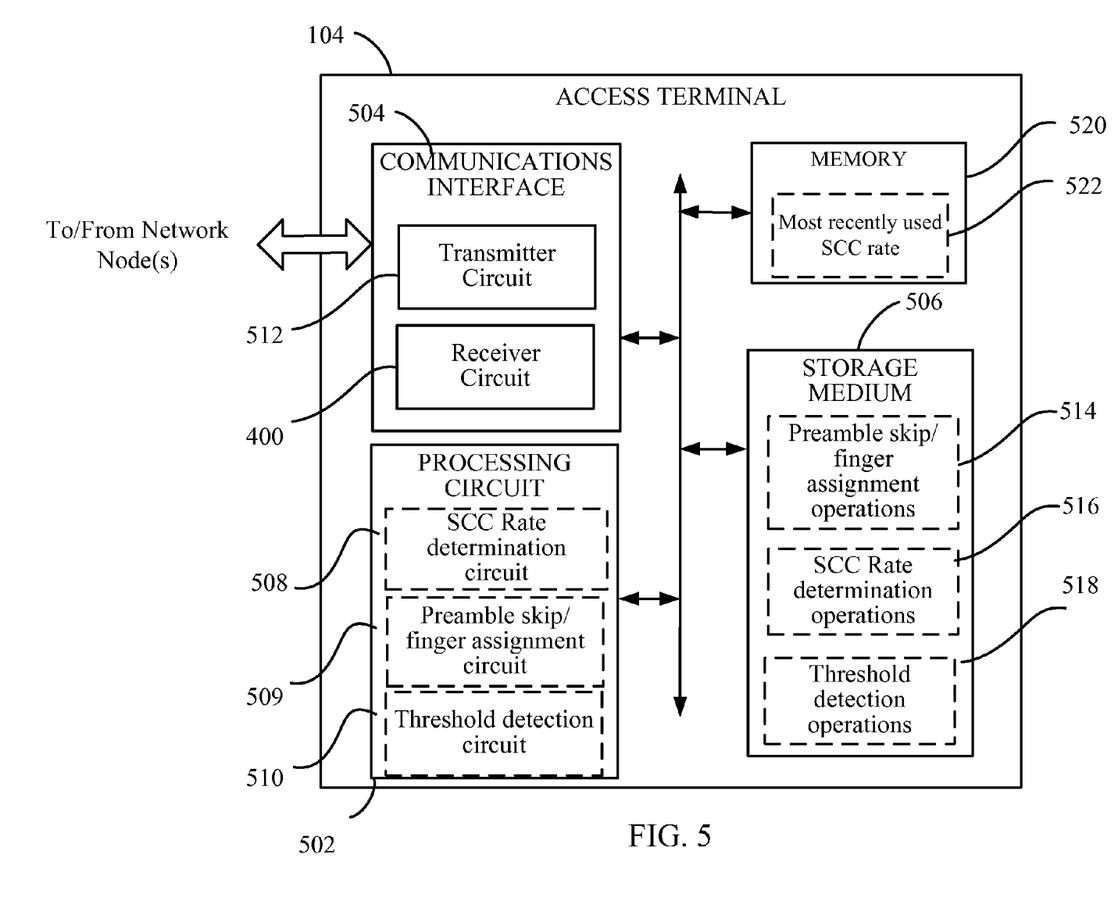
FIG. 5 is a block diagram illustrating select components of an access terminal configured to facilitate one or more features of the present disclosure.

Turning to FIG. 5, a block diagram is shown illustrating select components of an access terminal 104 configured to facilitate one or more features of the present disclosure according to at least one example. The access terminal 104 includes a processing circuit 502 coupled to or placed in electrical communication with a communications interface 504 and a storage medium 506.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is configured for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 502 may include an SCC rate determination circuit or module 508. SCC rate determination circuit 508 may include circuitry and/or programming (e.g., SCC rate determination operations 516 programming stored on the storage medium 506) configured to implement an SCC rate determination in processing circuit 502 without using the information in the preamble data, as described herein.

In some instances, the processing circuit 502 may include a preamble skip/finger assignment circuit 509. The preamble skip/receiver assignment circuit 509 may include circuitry and/or programming (e.g., preamble skip/receiver assignment operations 514 programming stored on the storage medium 506) configured to implement a delay prior to powering on receiver circuitry of the receiver system 400 during a slotted idle mode, as described herein.

In some instances, the processing circuit 502 may include a threshold detection circuit 510. The threshold detection circuit 510 may include circuitry and/or programming (e.g., threshold detection operations 518 programming stored on the storage medium 506) configured to implement aspects of the present disclosure as described herein below.

The communications interface 504 includes receiver circuit 400 and is configured to facilitate wireless communications of the access terminal 104. For example, the communications interface 504 may include circuitry and/or programming configured to facilitate the communication of information bi-directionally with respect to one or more wireless network devices (e.g., network nodes). The communications interface 504 may be coupled to one or more antennas 492 and includes wireless transceiver circuitry, including at least one receiver circuit 400 (e.g., corresponding to the receiver circuit 400 illustrated in FIG. 4) and/or at least one transmitter circuit 512.

The storage medium 506 may represent one or more processor-readable devices for storing programming, such as processor executable code or instructions (e.g., software, firmware), electronic data, databases, or other digital information. The storage medium 506 may also be used for storing data that is manipulated by the processing circuit 502 when executing programming. The processor-readable storage medium 506 may be a non-transitory processor-readable medium. For example, the storage medium 506 may be any available media that can be accessed by a general purpose or special purpose processor, including portable or fixed storage devices, optical storage devices, and various other mediums capable of storing, containing and/or carrying programming By way of example and not limitation, the storage medium 506 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. The processor-readable storage medium 506 may reside in the processing circuit 508, external to the processing circuit 508, or distributed across multiple entities including the processing circuit 508. The processor-readable storage medium 506 may be embodied in a computer program product. By way of example, a computer program product may include a processor-readable medium in packaging materials. Those skilled in the art will recognize how best to implement the described functionality presented throughout this disclosure depending on the particular application and the overall design constraints imposed on the overall system.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 104).

Programming stored by the storage medium 506, when executed by the processing circuit 502, causes the processing circuit 502 to perform one or more of the various functions and/or process steps described herein. For example, the storage medium 506 may include preamble skip and finger assignment operations 514 configured to cause the processing circuit 502 to implement a delay prior to powering on the receiver circuit 400 and assigning a finger 408 during a slotted idle mode to skip the preamble, as described herein. The storage medium 506 may also include SCC rate determination operations 516 configured to cause the processing circuit 502 to implement finger assignments on the receiver circuit 400 through control unit 410 during a slot time just after a first slot, as described herein. The storage medium 506 may also include a threshold detection operations 518 configured to cause the processing circuit 502 to implement aspects of the present disclosure only when a signal strength (e.g., one or more suitable characteristics of the received transmission) detected through threshold detection circuit 510 on processing circuit 502 is greater than a determined threshold. Thus, according to one or more aspects of the present disclosure, the processing circuit 502 may be configured to perform (in conjunction with the storage medium 506) any or all of the processes, functions, steps and/or routines for any or all of the access terminals (e.g., access terminal 104) described herein. As used herein, the term "configured to" in relation to the processing circuit 502 may refer to the processing circuit 502 being one or more of configured, employed, implemented, and/or programmed (in conjunction with the storage medium 506) to perform a particular process, function, step and/or routine according to various features described herein.

In some instances, access terminal 104 may include additional memory for data storage such as memory 520. Memory 520 may, for example, include data related to the most recently used SCC rate 522.

Figure 6:
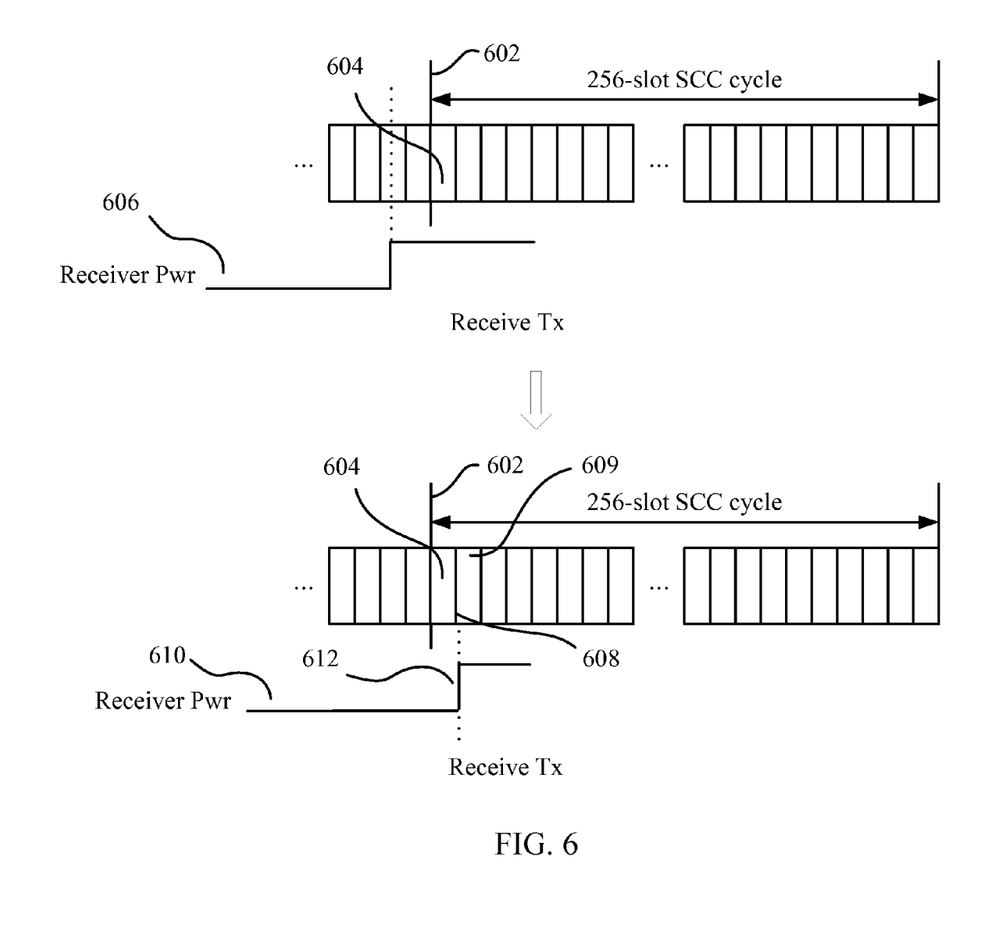
FIG. 6 is a timing diagram depicting a time slot structure for transmission of data and receiver power when implementing various aspects of the present disclosure.

According to at least one aspect of the present disclosure, access terminals 104 are configured to facilitate power conservation by reducing the duration of the awake state (and similarly increasing the duration of the standby state). The time required for the access terminal to wake up and decode incoming page messages is an important factor of the device's standby time. FIG. 6 is a timing diagram depicting a time slot structure for transmission of data and receiver power for implementing various aspects of the present disclosure. As discussed above, the first half slot 604 includes the preamble 310 (see FIG. 3). An access terminal 104 according to one or more aspects of the present disclosure may wake up and assign a receiver finger approximately 2 or 3 ms prior to an initial boundary 602 of a control channel transmission, as is conventional. That is, the access terminal 104 may power up its receiver circuitry 400 as shown in the first receiver power graph 606 to be ready to receive a transmission at the initial boundary 602 and receive the data rate information from the preamble 310.

However, rather than waking up the access terminal 104 and preparing the receiver by assigning one or more of the fingers 408 of the receiver system 400 before the preamble 310, in some aspects of the disclosure, the access terminal 104 may skip the preamble 310 in the half slot 604 and delay the wake up state for a suitable amount of time to occur after the control packets are expected to be received, e.g., as shown by the boundary 612 of the second receiver power graph 610. Therefore, according to one example of the present disclosure, for every wake up, the awake time of the receiver may thus be reduced by 1 slot or 1.66 ms, plus the 2 or 3 ms prior to the preamble, when a conventional access terminal would have assigned the finger. That is, according to one aspect of the present disclosure, the access terminal 104 may be enabled to wake up and assign a receiver finger 408 at a suitable time before the initial boundary 608 of the half slot 609 after the first half slot 604 of the control channel transmission. In various examples, the time before the boundary 608 at which the access terminal 104 may awake may be chosen to provide a sufficient time for any processing delay that may correspond to a finger assignment. Therefore, the duration of the wake up state can be reduced and the access terminal 104 power may be conserved.

Figure 7:
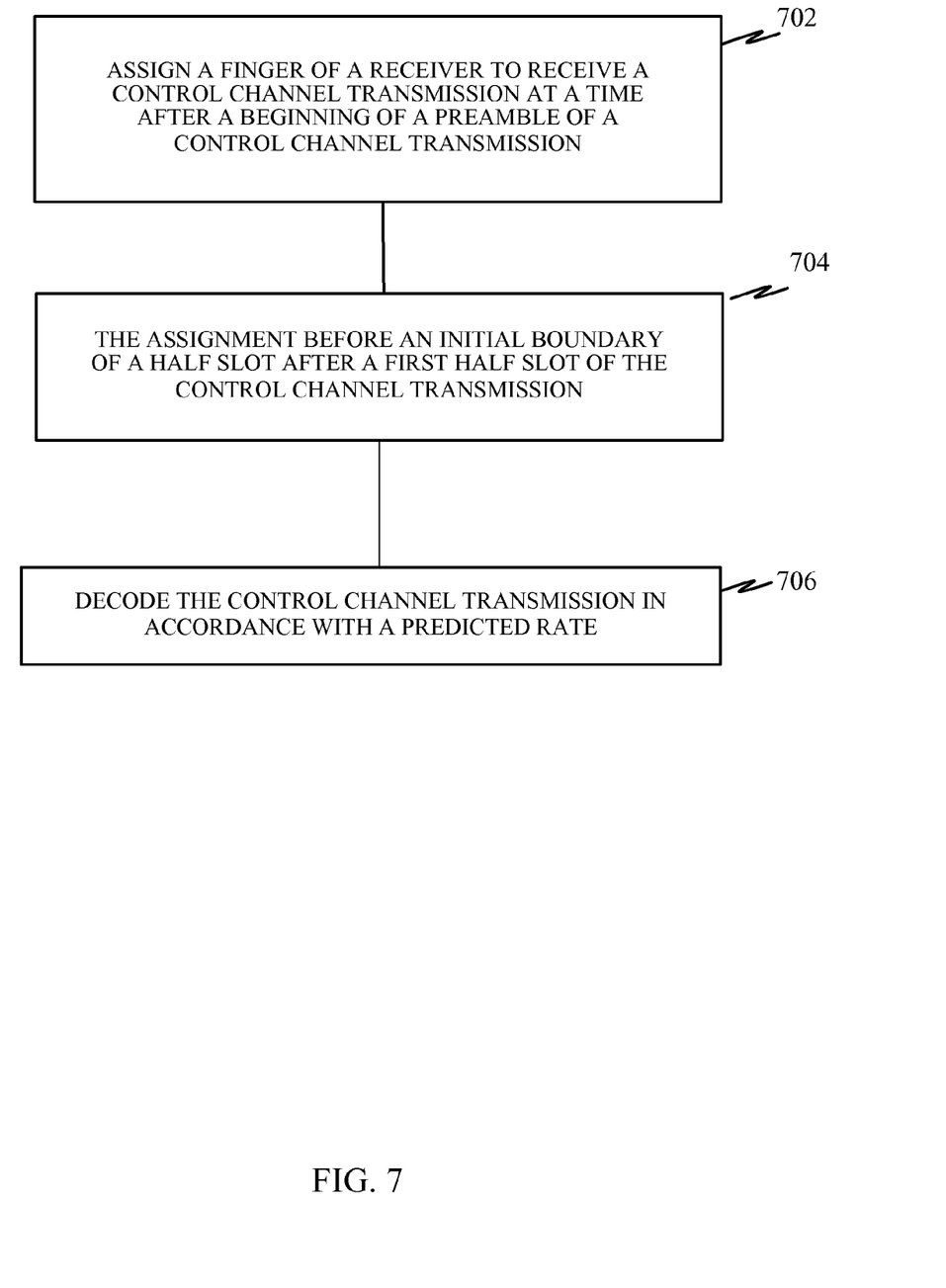
FIG. 7 is a flow diagram illustrating at least one example of a method for delaying the receiver finger assignments operational on an access terminal when implementing various aspects of the present disclosure.

FIG. 7 is a flow diagram illustrating at least one example of a method for delaying the finger assignments operational on an access terminal, such as the access terminal 104. In some examples, the illustrated method may be implemented by receiver circuit 400 of communication interface 504, and/or the processing circuit 502, e.g., with instructions for the method stored on storage medium 506. In other examples, the illustrated method may be implemented by any suitable apparatus or means for carrying out the described functions. At step 702, the scheduled time for executing the wake up from the slotted idle mode, instead of assigning and powering the fingers 408 prior to the boundary 602 (see FIG. 6) of the first half slot 604, the assignment and power of the receiver fingers 408 may be delayed until after the beginning of the preamble 310 (see FIG. 3) of a packet on the control channel transmission 200. At step 704, the assignment of the finger 408 may occur at a suitable time before the boundary of a half slot after the first half slot 604 (see FIG. 6) of the packet on the control channel transmission 200 containing the preamble 310. For example, the control unit 410 (e.g., the preamble skip/finger assignment circuit 509 of FIG. 5) executing the preamble skip/finger assignment operations 514 can delay the assignment of a finger 408 of the receiver 400 to receive the control channel packet 200 at the time 612 after the preamble 310 in the first half slot 604.

Conventional access terminals use the preamble data to obtain the SCC data rate, which provides the access terminal 104 with the control channel data rate of the data packets on the control channel, and enables the receiving device to suitably decode the packets based on that rate. However, the delay of the finger assignment in step 704 means that access terminal 104 does not obtain the information related to the SCC data rate from preamble 310. Thus, alternative methods of determining the SCC rate to decode the control channel transmission data without needing the preamble data are described below. Some examples of the alternative methods include determining the SCC rate from the most recently used sector, and determining the SCC rate by utilizing two candidate data rates to simultaneously decode the control channel transmission data.

At step 706, the control channel packet 200 is decoded, e.g., through decoder 414, using a predicted SCC data rate, which may be determined by the methods described below.

Figure 8:
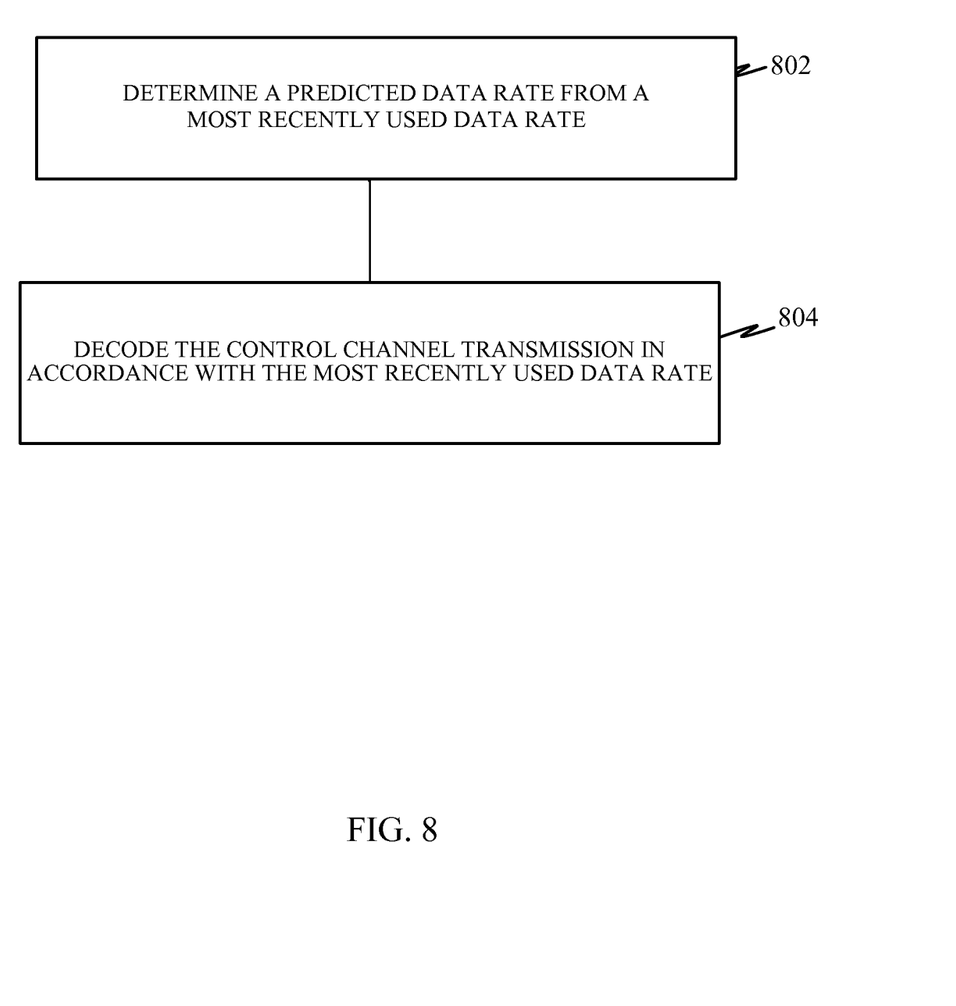
FIG. 8 is a flow diagram illustrating at least one example of a method for determining an SCC rate of a control channel transmission to implement aspects of the present disclosure.

FIG. 8 is a flow diagram illustrating at least one example of a method for determining an SCC rate of a control channel transmission to implement aspects of the present disclosure. In some examples, the method illustrated in FIG. 8 may be implemented by an access terminal, such as the access terminal 104. In some examples, the illustrated method may be implemented by the receiver circuit 400 of communication interface 504, and/or the processing circuit 502, e.g., with instructions for the method stored on storage medium 506. In other examples, the illustrated method may be implemented by any suitable apparatus or means for carrying out the described functions.

At step 802, access terminal 104 may determine a predicted data rate, e.g., in accordance with a data rate that was used at a most recently used sector. That is, if it is known that packets are incoming from the same sector, there may be no need to get the SCC information from the preamble again. Thus, access terminal 104 may assume the same SCC rate in the incoming control channel packets. Accordingly, this most recently used SCC rate may be utilized as the SCC rate for decoding the current control channel transmission. That is, at step 804, this SCC rate may be used for decoding incoming control channel packets. For example, the processing circuit 502 (e.g., the SCC rate determination circuit 508) executing the SCC rate determination operations 516 may determine that the SCC rate is known from the most recently used sector and does not require decoding the preamble. The SCC rate from the most recently used sector may be stored at memory 520 containing a most recently used SCC rate 522, and may be determined from one or more samples from sample RAM 404. Thus, in one aspect, the preamble is skipped and the finger or fingers are assigned just before the boundary 608 (see FIG. 6) of the half slot after the first half slot 604 of the control transmission rather than at a time prior to the initial boundary of the preamble 302 (see FIG. 3).

In another aspect of the present disclosure, the access terminal 104 may include two, three, or more demodulation chains in RF/IF system 490 shown in FIG. 4. In this aspect of the present disclosure, when the delayed finger assignment is utilized two decode chains may be simultaneously used and the control channel packets may be simultaneously decoded utilizing an assumed SCC rate on each of the decode chains. The coding rate of information on the control channel packet 200 corresponds to data rate control (DRC) information. In this exemplary aspect, the assumption of DRC1 and DRC2 is used. Here, a DRC1 control packet may correspond to 16 slots with a data rate of 38.4 kbps, and a DRC2 control packet may correspond to 8 slots with a data rate of 76.8 kbps. For example, the rates may be limited and the rates may only be DRC1 and DRC2 in one aspect of the present disclosure.

Figure 9:
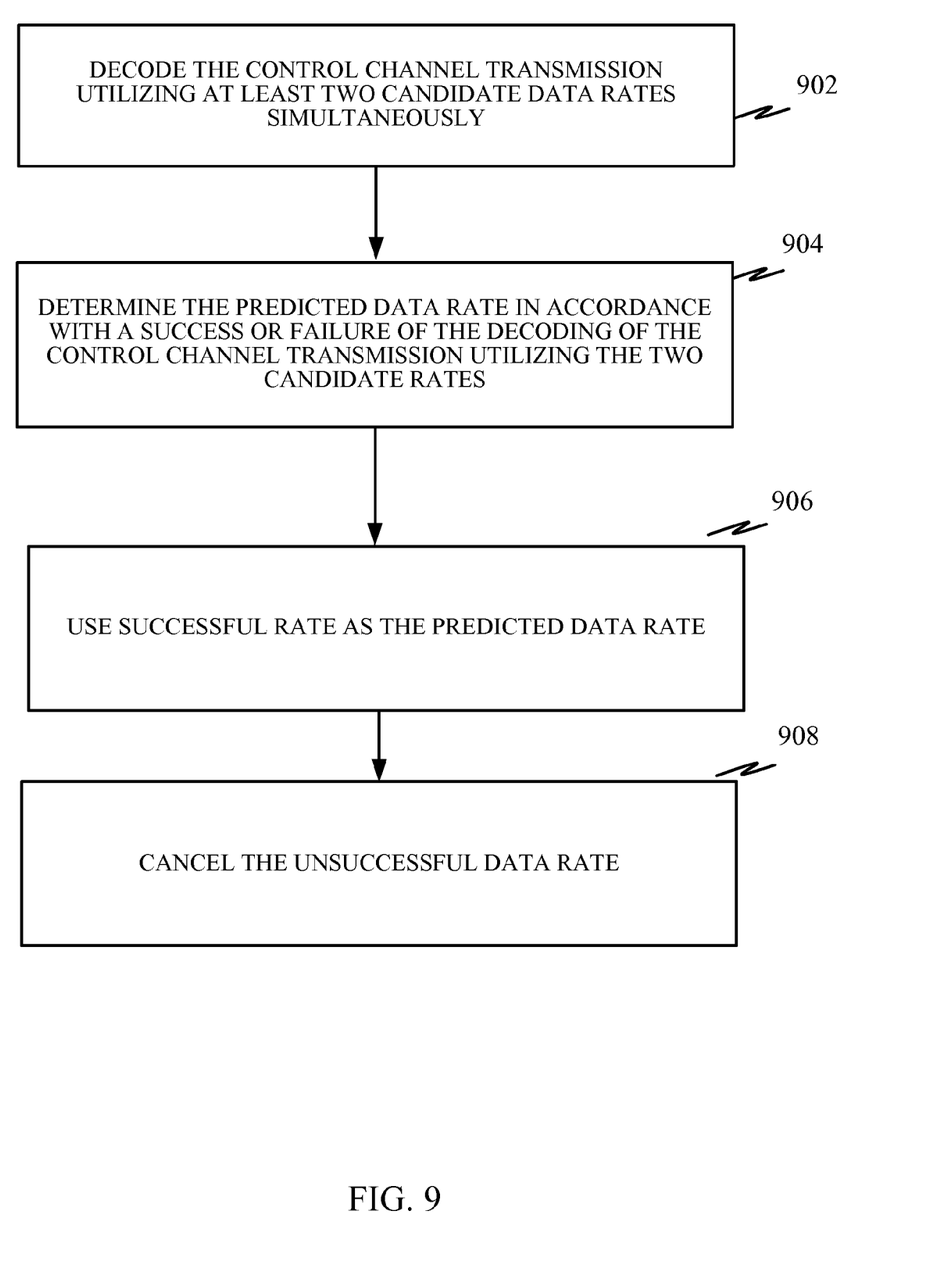
FIG. 9 is a flow diagram illustrating at least one example of a method for determining the SCC rate of the control channel transmission utilizing two rates simultaneously to implement aspects of the present disclosure.

FIG. 9 is a flow diagram illustrating at least one example of a method for determining the SCC data rate of the control channel transmission utilizing two rates simultaneously to implement aspects of the present disclosure. In some examples, the method illustrated in FIG. 9 may be implemented by an access terminal, such as the access terminal 104. In some examples, the illustrated method may be implemented by the receiver circuit 400 of communication interface 504, and/or the processing circuit 502, e.g., with instructions for the method stored on storage medium 506. In other examples, the illustrated method may be implemented by any suitable apparatus or means for carrying out the described functions.

At step 902, the SCC rate is unknown and two candidate data rates are used simultaneously to decode the control channel transmission data. At step 904, the data rates are applied to two decode chains (e.g., a hardware block in RF/IF system 490, or in another example, between the sample RAM 404 and a back-end RAM (not pictured)) to determine the correct data rate in accordance with a success or failure of the decoding of the control channel transmission using the two rates. More specifically the decode chains may be utilized to demodulate and soft combine the I/Q samples, which may then go through a deinterleaver and decoder, such that decoded data packets may be saved at a decoder output buffer. For example, the processing circuit 502 (e.g., the SCC rate determination circuit 508) executing the SCC rate determination operations 516 may determine two candidate SCC rates to be applied at RF/IF system 490. At step 906, one of the two candidate rates, DRC1 or DRC2, for example, will be the correct assumption and the successful decoding is thereafter known as the correct rate. The correct rate is determined by processing circuit 502 (e.g., the SCC rate determination circuit 508) executing the SCC rate determination operations 516. In this case, DRC1 and DRC2 are decoded simultaneously at step 902. The decoding occurs at the third half slot with samples from the second half slot. That is, since the second half slot may include the control channel packet, the decoding may begin during the third half slot, which is after the control channel packet in the second half slot has been received. When the control channel packet is decoded by one rate decoding, the decoding utilizing the other unsuccessful rate may be cancelled at step 908.

Figure 10:
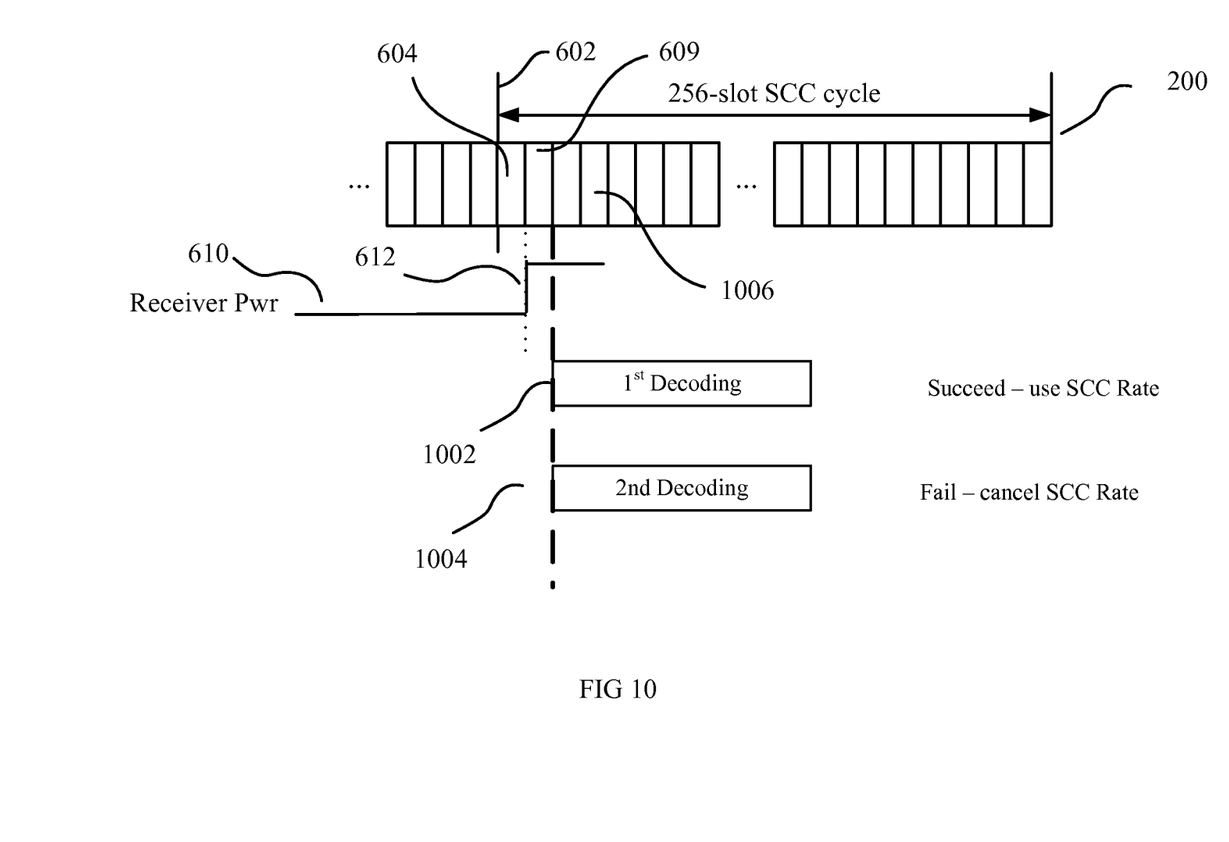
FIG. 10 is a timing diagram depicting a time line for the decoding of data using two data rates simultaneously for implementing various aspects of the present disclosure.

FIG. 10 is a block diagram depicting an exemplary time line for the decoding of data using two data rates simultaneously for implementing various aspects of the present disclosure, such as the method described above and illustrated in FIG. 9. As seen in FIG. 10, the second timeline 610 illustrated in FIG. 6 is shown, wherein receiver wake-up and finger assignment is delayed until after the transmission of the preamble within the first half slot 604. Turning now to FIG. 10, at a third slot 1006 of the control channel packet 200, a first SCC rate 1002 is used to decode the control channel of the control channel transmission. Simultaneously, a second SCC rate 1004 is used to decode the control channel of the control channel transmission. In the example of FIG. 10, the first decoding 1002 is successful and that rate is used as the predicted data rate to decode the control channel transmission. The second decoding 1004 is unsuccessful and the data rate of 1004 is cancelled. Of course, in other examples within the scope of the present disclosure, any suitable number of two or more decoding rates may be simultaneously utilized to determine the actual coding rate of the control channel transmission.

Thus, in aspects of the present disclosure, without extracting the SCC rate from the preamble, the data rate may still be determined. As a result of delaying the finger assignment by skipping the preamble and then utilizing two or more decode chains or using the rate from a previously known sector, energy is conserved by maintaining the standby mode for a longer period of time.

In a further aspect of the present disclosure, the delayed finger assignment algorithms described above may be implemented only when the signal strength of the forward link control channel transmission is greater than a threshold signal strength. In that regard and referring to FIG. 11, a flow diagram illustrates at least one example of a method for determining if the control channel transmission energy is sufficient to implement aspects of the present disclosure. In at least one example, a delayed assignment may cause difficulties or failures in decoding the packets if the signal strength of the control channel transmission is weak. For instance, at step 1102, the processing circuit 502 executing threshold determination operations 518 may determine the control channel transmission energy from threshold detection circuit 510 of processing circuit 502 for a control channel transmission being received by receiver circuit 400 in access terminal 104. At step 1104, if a metric of the determined control channel transmission (e.g., a signal strength, a measured energy, a signal-to-noise ratio, or any other suitable metric) is at least greater than a threshold amount, then the delayed finger assignment method described above (e.g., illustrated in FIG. 7) may be executed at step 1108.

Figure 11:
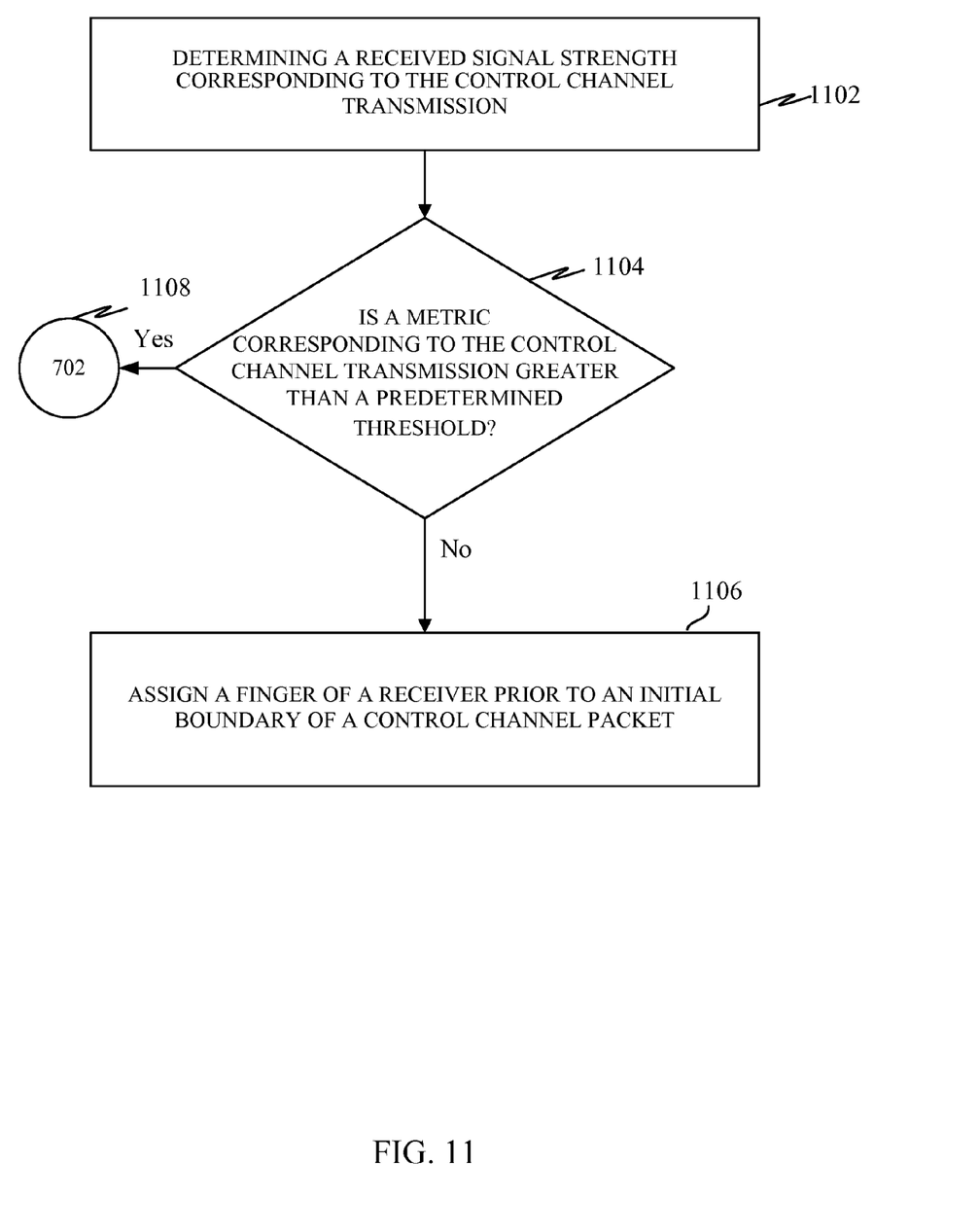
FIG. 11 is a flow diagram illustrating at least one example of a method for determining if the control channel transmission energy is sufficient to implement aspects of the present disclosure.

When the processing circuit 502 executing threshold determination operations 518 determines that the control channel transmission energy does not reach the threshold at step 1104, then the access terminal 104 may, at step 1106, assign a finger 408 for a control channel transmission 200 at a time prior to an initial boundary of a control channel packet, such that the access terminal 104 may receive and decode information carried on the preamble 310 of the control channel packet 200. That is, the control unit 410 may assign the receiver fingers 408 of the communications interface 504 prior to the preamble 310 of the control channel of the forward link transmission for one or more subsequent packets on the control channel packet 200.

While the above discussed aspects, arrangements, and embodiments are discussed with specific details and particularity, one or more of the components, steps, features and/or functions illustrated in FIGS. 1 through 11 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 4 and/or 5 may be configured to perform or employ one or more of the methods, features, parameters, and/or steps described in FIGS. 7, 8, 9, and/or 11. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication for receiving a control channel transmission that occupies a plurality of half slots, a first half slot of the plurality of half slots comprising a preamble of the control channel transmission, the preamble of the control channel transmission comprising information corresponding to a data rate of the control channel transmission, the method comprising:

determining whether a received signal strength corresponding to the control channel transmission is greater than a predetermined threshold;

if the received signal strength is less than or equal to the predetermined threshold, assigning a finger of a receiver to receive the control channel transmission prior to a beginning of the preamble of the control channel transmission and if the received signal strength is greater than the predetermined threshold:
assigning the finger of the receiver to receive the control channel transmission at a time after the beginning of the preamble of the control channel transmission, and before an initial boundary of a second half slot after the first half slot of the control channel transmission;
receiving the control channel transmission utilizing the assigned finger; and
decoding the control channel transmission in accordance with a predicted data rate.

2. The method of claim 1, wherein the first half slot contains the preamble.

3. The method of claim 1, wherein the predicted data rate corresponds to a most recently used data rate.

4. The method of claim 1, further comprising:
decoding the control channel transmission utilizing at least two candidate data rates ; and
determining the predicted data rate in accordance with a success or failure of the decoding of the control channel transmission utilizing the at least two candidate data rates.

5. The method of claim 4, wherein the decoding of the control channel transmission utilizing the at least two candidate data rates comprises simultaneously decoding the control channel transmission utilizing the at least two candidate data rates.

6. The method of claim 4, wherein the at least two candidate data rates comprise a DRC1 data rate and a DRC2 data rate.

7. The method of claim 4, further comprising:
decoding the control channel transmission utilizing the at least two candidate data rates simultaneously at a third half slot utilizing samples from a second half slot.

8. An apparatus for wireless receiving a control channel transmission that occupies a plurality of half slots, a first half slot of the plurality of half slots comprising a preamble of the control channel transmission, the preamble of the control channel transmission comprising information corresponding to a data rate of the control channel transmission, the apparatus comprising:
means for determining whether a received signal strength corresponding to the control channel transmission is greater than a predetermined threshold;
means for, if the received signal strength is less than or equal to the predetermined threshold, assigning a finger of a receiver to receive the control channel transmission prior to the beginning of the preamble of the control channel transmission; and
means for, if the received signal strength is greater than the predetermined threshold, assigning the finger of the receiver to receive the control channel transmission at a time after the beginning of the preamble of the control channel transmission, and before an initial boundary of a second half slot after a first half slot of the control channel transmission; and
means for, if the received signal strength is greater than the predetermined threshold, decoding the control channel transmission in accordance with a predicted data rate.

9. The apparatus of claim 8, wherein the first half slot contains the preamble.

10. The apparatus of claim 8, wherein the predicted data rate corresponds to a most recently used data rate.

11. The apparatus of claim 8, further comprising:
means for decoding the control channel transmission utilizing at least two candidate data rates; and
means for determining the predicted data rate in accordance with a success or failure of the decoding of the control channel transmission utilizing the at least two candidate data rates.

12. The apparatus of claim 11, wherein the means for decoding of the control channel transmission utilizing the at least two candidate data rates is configured to simultaneously decode the control channel transmission utilizing the at least two candidate data rates.

13. The apparatus of claim 11, further comprising:
means for decoding the control channel transmission utilizing the at least two candidate data rates simultaneously at a third half slot utilizing samples from a second half slot.

14. A wireless communication device for receiving a control channel transmission that occupies a plurality of half slots, a first half slot of the plurality of half slots comprising a preamble of the control channel transmission, the preamble of the control channel transmission comprising information corresponding to a data rate of the control channel transmission, the wireless communication device comprising:
a communication interface including a receiver circuit;
a storage medium; and
a processing circuit coupled to the communication interface and the storage medium, the processing circuit configured to:
determine whether a received signal strength corresponding to the control channel transmission is greater than a predetermined threshold;
if the received signal strength is less than or equal to the predetermined threshold, assign a finger of the receiver to receive the control channel transmission prior to a beginning of the preamble of the control channel transmission; and
if the received signal strength is greater than the predetermined threshold:
assign the finger of the receiver to receive the control channel transmission at a time after the beginning of the preamble of the control channel transmission, and before an initial boundary of a half slot after a first half slot of the control channel transmission; and
decode the control channel transmission in accordance with a predicted data rate.

15. The wireless communication device of claim 14, wherein the first half slot contains the preamble.

16. The wireless communication device of claim 14, wherein the predicted data rate includes a most recently used data rate.

17. The wireless communication device of claim 14, wherein the processing circuit is further configured to:
decode the control channel transmission utilizing at least two candidate data rates; and
determine the predicted data rate in accordance with a success or failure of the decoding of the control channel transmission utilizing the at least two candidate data rates.

18. The wireless communication device of claim 17, wherein the processing circuit, being configured to decode the control channel transmission utilizing the at least two candidate data rates, is further configured to simultaneously decode the control channel transmission utilizing the at least two candidate data rates.

19. The wireless communication device of claim 17, wherein the at least two candidate data rates includes a DRC1 data rate and a DRC2 data rate.

20. The wireless communication device of claim 17, wherein the processing circuit is further configured to:
decode the control channel transmission utilizing the at least two candidate data rates simultaneously at a third half slot utilizing samples from a second half slot.

21. A non-transitory processor-readable storage medium for receiving a control channel transmission that occupies a plurality of half slots, a first half slot of the plurality of half slots comprising a preamble of the control channel transmission, the preamble of the control channel transmission comprising information corresponding to a data rate of the control channel transmission, the non-transitory processor-readable storage medium comprising programming for causing a processing circuit to:
determine whether a received signal strength corresponding to the control channel transmission is greater than a predetermined threshold;
if the received signal strength is less than or equal to the predetermined threshold, assign a finger of a receiver to receive the control channel transmission prior to a beginning of the preamble of the control channel transmission; and
if the received signal strength is greater than the predetermined threshold:
assign the finger of the receiver to receive the control channel transmission at a time after the beginning of the preamble of the control channel transmission, and before an initial boundary of a half slot after a first half slot of the control channel transmission; and
decode the control channel transmission in accordance with a predicted data rate.

22. The non-transitory processor-readable storage medium of claim 21, wherein the first half slot contains the preamble.

23. The non-transitory processor-readable storage medium of claim 21, wherein the predicted data rate includes a most recently used data rate.

24. The non-transitory processor-readable storage medium of claim 21, further comprising programming for causing a processing circuit to:
decode the control channel transmission utilizing at least two candidate data rates simultaneously; and
determine the predicted data rate in accordance with a success or failure of the decoding of the control channel transmission utilizing the at least two candidate data rates.

25. The non-transitory processor-readable storage medium of claim 24, wherein the programming for causing a processing circuit to decode the control channel transmission utilizing the at least two candidate data rates is configured to simultaneously decode the control channel transmission utilizing the at least two candidate data rates.

26. The non-transitory processor-readable storage medium of claim 24, further comprising programming for causing a processing circuit to:
decode the control channel transmission utilizing the at least two candidate data rates simultaneously at a third half slot utilizing samples from a second half slot.

\* \* \* \* \*